United States Patent [19]

Britt et al.

[11] 4,341,561
[45] Jul. 27, 1982

[54] FOAMED INSULATING REFRACTORY

[75] Inventors: James M. Britt, Martinez; Charles C. Logue, Augusta, both of Ga.

[73] Assignee: The Babcock & Wilcox Company, New Orleans, La.

[21] Appl. No.: 256,415

[22] Filed: Apr. 22, 1981

[51] Int. Cl.³ .............................................. C04B 21/02
[52] U.S. Cl. ...................... 106/87; 106/97; 106/104; 501/84; 501/85; 501/124
[58] Field of Search ................ 106/86, 88, 87, 104, 106/97; 501/84, 85, 124

[56] References Cited

U.S. PATENT DOCUMENTS

| 3,565,647 | 2/1971 | Magder | 106/87 |
| 3,944,425 | 3/1976 | Magder | 106/87 |
| 4,174,226 | 11/1979 | Fitzpatrick et al. | 501/124 |
| 4,246,035 | 1/1981 | Maczura et al. | 501/124 |

*Primary Examiner*—James Poer
*Attorney, Agent, or Firm*—Robert J. Edwards; J. Henry Muetterties

[57] ABSTRACT

An unfired foamed-in-place two component insulating refractory and the method for preparing the same. The composition is composed of hydraulic cement, water and an acid, though it can also include an aggregate and/or fine grain inert filler. In the process, the dry ingredients are mixed with the water to form a slurry and thereafter the acid is added to the slurry and passed through a passive mixer before the acid-slurry mixture is discharged and allowed to foam and set.

8 Claims, 2 Drawing Figures

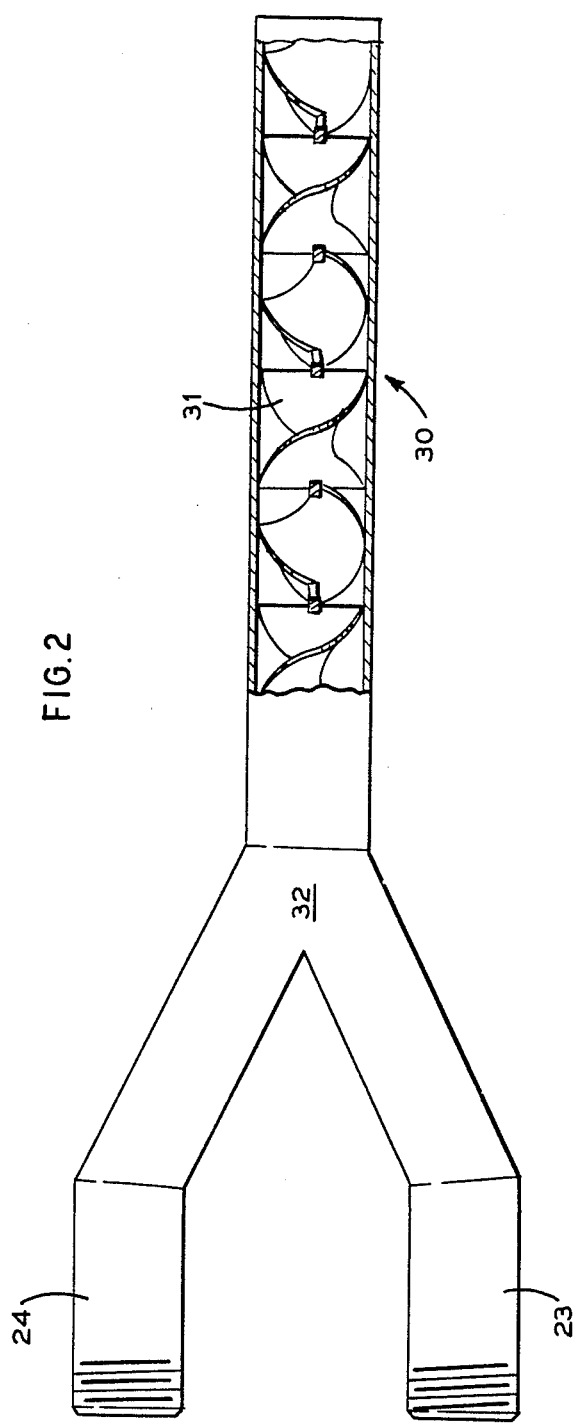

FOAMED INSULATING REFRACTORY

BACKGROUND OF THE INVENTION

1. Field of the Invention

This invention relates to refractories and particularly porous foamed ceramic insulating refractories and the method of producing these refractories. Insulating refractories are known in the art and are generally lightweight with relatively high porosity to provide thermal insulation for a furnace or kiln.

It is conventional practice to produce ceramic insulating refractories by using one of the following methods of introducing porosity: (1) by incorporating in the refractory material combustible particles which will be burnt out during firing thereby leaving voids, (2) by injecting air into a slurry of refractory particles or (3) by generating a gas in a slurry by means of a chemical reaction.

The selection of the ingedients which go into a particular refractory structure is and has been the subject of much study and experimentation and is in the purview of one skilled in refractory or ceramic art. A combination of inorganic refractory ingredients which is ideal for one use with a specific set of operating variables may be entirely unsuitable for another use or for a similar use with different operating conditions.

2. Description of the Prior Art

U.S. Pat. No. 3,944,425 (Magder) describes a fired refractory composed of clay, hydraulic cement, inert particulate lamellar foam stabilizer, water, and a gas generating agent. The agent preferred for foams intended for refractory use is the combination of hydrogen peroxide and a transitional metal oxide catalyst. Catalyzed hydrogen peroxide or an acid-carbonate combination is suggested for clay foam building products.

U.S. Pat. No. 3,565,647 (Magder) discloses a method of making a cellular material by subjecting the ingredients; clay, hydraulic cement, inert particulate lamellar foam stabilizer, water, and a gas generating agent to high-shear mixing in a container for a short period of time before discharging the material and allowing it to foam and set.

SUMMARY OF THE INVENTION

As a result of an extensive series of laboratory tests on various refractory mixes, it has been found in accordance with the invention that an unfired two-component foamed cellular ceramic insulating refractory can be made of 15-100% hydraulic cement, 0-85% fine grain inert filler, 0-85% aggregate, water, and an acid.

In accordance with the method of making the two-component foamed refractory, an acid is delivered to a first container and water is delivered to a second container, to which is also delivered separately from the water, a mixture of finely divided solids containing a hydraulic cement, a fine grain inert filler and an aggregate, each in an amount within the ranges given above. A high agitation mixer, of the type known in the art, is used within the second container to mix the solid materials with the water for a period not to exceed five minutes, thereby forming a slurry within the second container. The amount of water added is controlled so that a slurry viscosity of about 300 to 3000 CPS is obtained. Separate pumps are connected to each container and the slurry and acid are pumped through separate hoses. Each hose is thereafter connected to a mixer having no moving parts hereafter referred to as a passive mixer whereupon the acid is contacted with the slurry and thereafter the mixture is promptly discharged and allowed to foam and set.

More particularly with respect to the novel method of making the ceramic foam, a passive mixer is used so as not to impart excess mixing energy thus allowing control of the rise and set of the foam. This is an advantage because mixers which input energy cause the foamed refractory to be unstable and to delaminate.

It is an object of this invention to provide unfired lightweight ceramic compositions which are dimensionally stable up to 3000° F. (1649° C.) at densities below about 120 pounds per cubic foot.

It is a further object of this invention to provide a lightweight cellular ceramic insulating refractory and a method of preparing the novel compositions of this invention.

BRIEF DESCRIPTION OF THE DRAWINGS

FIG. 2 is a sectional top view of a mixing apparatus suitable for practicing this invention.

DESCRIPTION OF THE PREFERRED EMBODIMENTS

Figure 1:
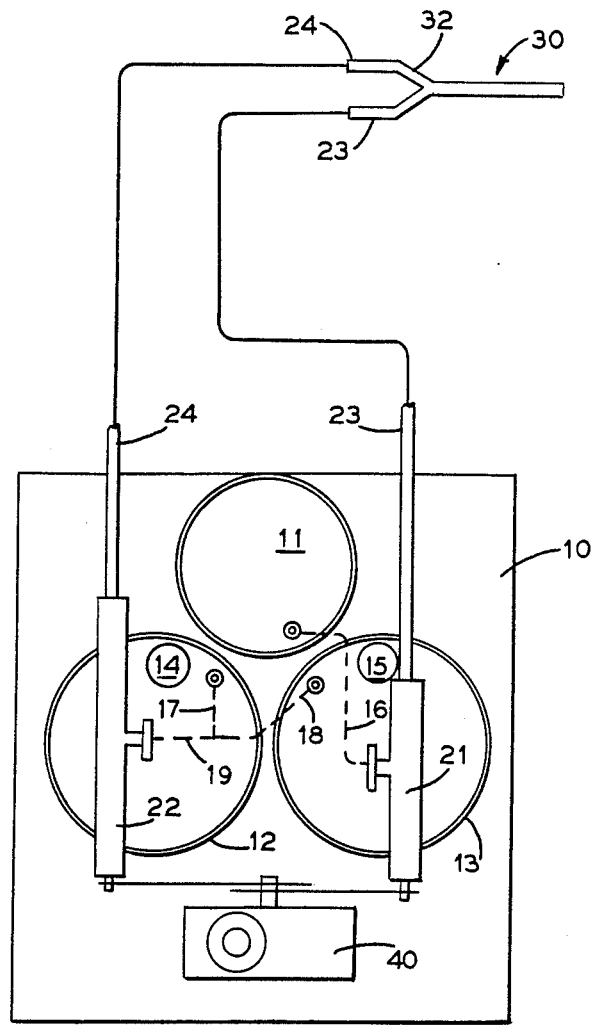
FIG. 1 is a schematic top view of one form of apparatus suitable for practicing this invention.

The particular inorganic refractory materials; cement, aggregate and fine grain inert filler, selected to comprise the compositions of this invention will depend upon the requirements of the use intended. It is within the purview of one skilled in the refractory or ceramic art to understand which final properties of the product are influenced by which material.

The cement selection influences the strength and the refractoriness of the final product and also the degree of reaction with the acid used within the system. Cements including any type of Portland cement and calcium aluminate cements such as Fondu, Secar 71 or Secar 80, all three available from the Lone Star LaFarge Company of Norfolk, Va., CA-25 available from the Aluminum Company of America of Bauxite, Ark., Lumnite and Refcon, available from United States Steel Corporation of Pittsburgh, Pa., can be used with this invention. It has been discovered that there must be at least 15% cement, based on the total weight of the dry ingredients. While there must be a certain minimum amount of cement present in order to provide adequate strength to the foamed refractory, there is no upper limit. Therefore it is possible to make a foamed refractory entirely of cement, although such procedure is not very desirable because of the poor characteristics of a product made of 100% cement.

The fine grain inert filler used in this invention may be such as kaolinite, pyrophyllite, wollonstonite, talc, alumina, etc. Ball clays should be avoided due to their thixothropic nature and high water demands. These fillers may be used alone or in combinations of two or more. The amount used is dependent upon the desired properties of the final product.

The aggregates to be used include but are not limited to such materials as crushed rock, expanded shale, calcined clays, kyanite, calcined bauxite, mullite, tabular alumina, perlite, etc. Preferably the particle size of such aggregate should be −20 mesh. The exact amount of aggregate chosen will be dictated primarily by the refractoriness and density desired in the final product, as will readily be understood by those skilled in the art.

The amount of the acid depends upon the degree of reactivity of the acid with the chosen cement and the desired density of the final product. The acid can be an acid of such concentration as dictated by design criteria; such acids include phosphoric acid ($H_3PO_4$), sulfuric acid ($H_2SO_4$), hydrochloric acid (HCl) or hydrofluoric acid (HF).

Batches were prepared by thoroughly mixing the dry ingredients in the proportions by weight as given in examples 1-22, Tables I and II. In examples 1-11, the water was added in the amount given as a percentage of the total dry weight, to obtain a slurry with the stated viscosity. In examples 12-22 the viscosity was controlled to fall in the range of 1500 to 2000 CPS. The mixing time of each slurry was less than 5 minutes and preferably about 2 minutes. The slurries were then mixed with a solution of 75% phosphoric acid. The amount of acid combined with the slurry was selected to vary the final density. The addition of the phosphoric acid to the slurry is accomplished by using a passive mixer of the kind available from Kenics Corporation of North Andover, Mass. The mixture was immediately discharged from the passive mixer into molds and allowed to foam and set. No firing of the product is necessary and the air dried density is given for Examples 1-11. No density data was taken for Examples 12-22.

area of placement be at least 70° F. (21° C.) in order to maintain the foaming and setting of the mixture.

Referring to FIG. 1, a mobile support platform 10 is shown upon which three tanks or containers 11, 12 and 13 are mounted. A liquid acid is delivered to the first tank 11. A predetermined amount of water is delivered to the second tank 12. High agitation mixers 14 and 15, of the type well known in the art, are located within tanks 12 and 13 respectively. A predetermined amount of each solid ingredient, in accordance with the inventions, is mixed with the water within tank 12 while mixer 14 is activated. The first tank 11 is connected to a pump 21 by means of conduit 16, and the second and third tank 12 and 13 are connected to a second pump 22 by means of conduits 17, 18 and 19. The water and solid ingredients are alternately mixed and pumped from tanks 12 and 13 to insure continuous flow. A valve (not shown) is attached to the junction of conduits 17, 18 and 19 to direct flow from either tank 12 or 13. The pumps, 21 and 22, transport the acid and the slurry through separate hose lengths 23 and 24 to a Y-section 32 which is the inlet to a passive mixer 30. Motor 40 which is used to power pumps 21 and 22 may also be mounted on support platform 10.

Referring to FIG. 2, the passive mixer 30 is shown with hose lines 23 and 24 connected thereto. Controlled quantities of acid and slurry are pumped through lines 23 and 24 respectively. Within the passive mixer 30 is a

TABLE I

| EXAMPLES 1-11 MIX | 1 | 2 | 3 | 4 | 5 | 6 | 7 | 8 | 9 | 10 | 11 |
|---|---|---|---|---|---|---|---|---|---|---|---|
| REFCON | 100% | 100% | 100% | 100% | 100% | 15% | 15% | 15% | 15% | 15% | 15% |
| PYROPHYLLITE | — | — | — | — | — | 85% | 85% | 85% | — | — | — |
| KAOLIN CALCINE | — | — | — | — | — | — | — | — | 85% | 85% | 85% |
| WATER | 32% | 32% | 54% | 54% | 32% | 94% | 94% | 124% | 38% | 26% | 26% |
| VISCOSITY OF SLURRY, CPS | 3000 | 3000 | 300 | 300 | 3000 | 3000 | 3000 | 300 | 300 | 3000 | 3000 |
| ACID ($H_3PO_4$) | 35.5% | 21.6% | 35.5% | 21.6% | 49.4% | 35.5% | 49.4% | 49.4% | 49.4% | 49.4% | 69.6% |
| DENSITY, PCF | 63.5 | 102.8 | 91.7 | 99.6 | 21.9 | 77.7 | 82.9 | 77.8 | 96.2 | 105.6 | 95.3 |

TABLE II

| EXAMPLES 12-22 MIX | 12 | 13 | 14 | 15 | 16 | 17 | 18 | 19 | 20 | 21 | 22 |
|---|---|---|---|---|---|---|---|---|---|---|---|
| REFCON | 20.1 | 22.6 | 25.1 | 24.1 | 25.8 | 29.8 | 27.2 | 26.2 | 24.3 | 34.6 | 14.8 |
| PYROPHYLLITE | 6.7 | 7.5 | 8.4 | 8.0 | 12.9 | 11.9 | 13.6 | 13.1 | 11.8 | 14.8 | 9.1 |
| KAOLIN CALCINE | 8.7 | 9.8 | 10.9 | 10.4 | 8.8 | 8.2 | 9.3 | 8.9 | 8.2 | 3.6 | 32.1 |
| WATER | 31.2 | 35.1 | 30.6 | 29.4 | 28.2 | 27.8 | 29.7 | 32.2 | 31.3 | 25.0 | 24.0 |
| VISCOSITY OF SLURRY, CPS | WITHIN THE RANGE OF 1500-2000 CPS | | | | | | | | | | |
| ACID ($H_3PO_4$) | 33.4 | 25.1 | 25.1 | 28.1 | 24.3 | 22.3 | 20.2 | 19.6 | 24.3 | 22.0 | 20.0 |
| DENSITY, PCF | — | — | — | — | — | — | — | — | — | — | — |

More particular with respect to the preferred composition of matter (Example 22), experimentation has shown that the most favorable results are obtained from a slurry composed of about 14.8% Refcon cement, about 9.1% pyrophyllite, about 32.1% 35M/F calcined Georgia kaolin clay and about 24% water. The slurry is to be mixed with a solution of 75% phosphoric acid in approximately a 4:1 ratio or about 20.0% of acid by total weight of the mixture. The mixture is immediately discharged from the passive mixer and the reaction between the acid and the cement produces steam vapor and a release of hydrogen gas. This released gas causes the mixture to rise and the heat from the exothermic reaction causes the mixture to set without the application of additional heat. It is preferred that the water temperature be about 70°-90° F. (21°-32° C.) and critical that the surrounding surface temperature about the spiral nozzle section 31 responsible for all the mixing which takes place between the acid and the slurry. Thereafter, the acid-slurry mixture is discharged from the passive mixer 30 and allowed to foam and set without the addition of heat other than that which it generates itself.

In the preferred embodiment, the water added to tank 12 and 13 is at a temperature of 70° F. to 90° F. (21° C. to 32° C.). The pumps 21 and 22 and hose lines 23 and 24 are sized to accommodate acid and slurry mass flow rates in which the slurry's mass flow rate is about four times that of the acid's mass flow rate. When prepared under the conditions as set forth above the product will set in approximately 2 minutes.

While in accordance with the provisions of the statutes there is illustrated and described herein a specific embodiment of the invention and those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. A two-component foamed cellular refractory product having a density in the range of about 20 to about 120 lb/ft.$^3$ produced from a mixture consisting of 15%–100% hydraulic cement, 0–85% fine grain inert filler, 0–85% aggregate, all on a dry weight basis, water, wherein the water is added to the dry mixture in an amount to attain a slurry viscosity of about 300 CPS to 3000 CPS and an acid selected from the group consisting of $H_3PO_4$, $H_2SO_4$, HF and HCl.

2. A two-component foamed-cellular refractory product according to claim 1 having a density of about 45 to 50 lbs./ft.$^3$ produced from a mixture consisting of about 14.8% cement, about 9.1% pyrophyllite, about 32.1%–35 M/F calcined clay, about 24% water and about 20% of a solution of 75% phosphoric acid, on a total mixture weight basis.

3. The product according to claim 1 or 2 wherein the water has a temperature of about 70° F. to 90° F. (21° C. to 32° C.).

4. The method of preparing a two-component foamed cellular refractory product having a density in the range of about 20 to about 120 lb/ft$^3$ which comprises:
   (a) delivering and mixing a first component in a first container consisting of 15–100% hydraulic cement, 0–85% fine grain inert filler, 0–85% aggregate, all on a dry weight basis, and water, wherein the amount of water is controlled to attain a slurry viscosity of about 300 cps to about 3000 cps,
   (b) delivering to a second container a second component, said second component being an acid selected from the group consisting of $H_3PO_4$, $H_2SO_4$, HCl and HF.
   (c) pumping a controlled quantity of the slurry and a controlled quantity of the acid through a passive mixer to form a mixture.
   (d) discharging the two-component mixture, and
   (e) allowing the mixture to foam and set without the application of heat additional to that produced by the reaction.

5. The method of preparing a two-component foamed cellular refractory product according to claim 4 wherein the first component is alternately delivered and mixed in the second container and a third container, and alternately pumping a controlled quantity of the slurry from the second and third containers and a controlled quantity of acid through the passive mixer to form the mixture.

6. The method of preparing a two-component foamed cellular refractory product according to claim 4 or 5 wherein the controlled quantity of slurry and the controlled quantity of acid are pumped in about a 4:1 ratio.

7. The method of preparing a two-component foamed cellular refractory product having a density of about 45–50 lb/ft$^3$ which comprises the steps of:
   (a) delivering and mixing a first component in a first container consisting of about 26.3% cement, about 16.3% pyrophyllite and about 57.4%–35 M/F Kaolin calcine, all on a dry weight basis, and water, wherein the amount of water is controlled to attain a slurry viscosity of about 1500 to 2000 cps,
   (b) delivering to a second container a second component, said second component being a solution of 75% phosphoric acid,
   (c) pumping a controlled quantity of the slurry and a controlled quantity of the acid through a passive mixer to form a mixture in about a 4:1 ratio,
   (d) discharging the two-component mixture, and
   (e) allowing the mixture to foam and set without the application of heat additional to that produced by the reaction.

8. The method of preparing a two component foamed cellular refractory product according to claim 7 wherein the product sets in about 2 minutes.

* * * * *